US011269987B2

(12) United States Patent
Green et al.

(10) Patent No.: US 11,269,987 B2
(45) Date of Patent: Mar. 8, 2022

(54) SECURITY CREDENTIALS MANAGEMENT FOR CLIENT APPLICATIONS

(71) Applicant: International Business Machines Corporation, Armonk, NY (US)

(72) Inventors: Sophie D. Green, Andover (GB); David James Nice, Southampton (GB); Ledina Hido-Evans, Winchester (GB); Stewart O. M. Francis, Hampshire (GB); Thomas Foyle, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 183 days.

(21) Appl. No.: 16/564,012

(22) Filed: Sep. 9, 2019

(65) Prior Publication Data

US 2021/0073370 A1 Mar. 11, 2021

(51) Int. Cl.
  *G06F 21/45* (2013.01)
  *G06F 21/60* (2013.01)
  *G06F 21/40* (2013.01)

(52) U.S. Cl.
  CPC .............. *G06F 21/45* (2013.01); *G06F 21/40* (2013.01); *G06F 21/602* (2013.01)

(58) Field of Classification Search
  CPC .......... G06F 21/40; G06F 21/45; G06F 21/46; G06F 21/602; G06F 21/31; G06F 21/316; G06F 21/335; H04L 63/16
  See application file for complete search history.

(56) References Cited

U.S. PATENT DOCUMENTS

| 9,147,063 | B1 | 9/2015 | Florissi | |
|---|---|---|---|---|
| 2009/0311251 | A1 | 1/2009 | Bjorn | |
| 2013/0145170 | A1* | 6/2013 | Rese | G06F 21/41 713/183 |
| 2014/0075524 | A1 | 3/2014 | Ho | |
| 2015/0227733 | A1* | 8/2015 | Yu | G06F 21/31 726/19 |

(Continued)

FOREIGN PATENT DOCUMENTS

| CN | 103326991 A | 9/2013 |
|---|---|---|
| CN | 110166220 A | 8/2019 |

(Continued)

OTHER PUBLICATIONS

Mell et al., "The NIST Definition of Cloud Computing", Recommendations of the National Institute of Standards and Technology, NIST Special Publication 800-145, Sep. 2011, 7 pages.

*Primary Examiner* — Olugbenga O Idowu
(74) *Attorney, Agent, or Firm* — Brian M. Restauro

(57) ABSTRACT

Method and system are provided for security credentials management for client applications. The method includes: detecting a user is entering security credentials for authentication of a client application; hashing at least a portion of the entered credentials to obtain current hashed credentials and storing the current hashed credentials; and comparing the current hashed credentials to previously stored hashed credentials for the client application. If the current hashed credentials and the previously stored hashed credentials match, the method may store the credentials for automatic completion of the credentials for the client application.

17 Claims, 7 Drawing Sheets

(56) References Cited

U.S. PATENT DOCUMENTS

2017/0070524 A1    3/2017   Bailey
2018/0248698 A1    8/2018   Kominar
2018/0255030 A1    9/2018   Gupta

FOREIGN PATENT DOCUMENTS

CN     110166250 A    8/2019
WO    2011145098 A1   11/2011

* cited by examiner

SECURITY CREDENTIALS MANAGEMENT FOR CLIENT APPLICATIONS

BACKGROUND

The present invention relates to security credentials management, and more specifically, to security credentials management for storing reusable credentials for client applications.

Client applications may be configured to store user login identifications and passwords. Some client computing devices may use password management services to store their users' login credentials for different client applications.

Stored credentials can be transmitted automatically to a network server to initiate user authorization. This process adds to the users' convenience by eliminating the time required to re-enter credentials from a known client computer.

To enhance network security measures, many companies have adopted multi-factor authentication (MFA) protocols, in which users enter two forms of identification in order to access an application or network. In a number of MFA systems, the first form of identification is a fixed password and a second form of identification is a one-time password (OTP) generated for a specific instance and expiring after use or a period of time.

MFA provides secure authentication by requiring credentials from different sources. In other words, the source of the first credentials should be different than the source of the second credentials.

A user can enter a primary identification and second credentials can be a one-time password (OTP) generated by a security token. The OTP can be any combination of numbers, letters, and symbols in the form of a passcode or pin code. The OTP can be generated by a device in the ownership of the user such as a keyring device or smart card that has an OTP generator, or by a software token embedded into a smartphone, tablet, personal computer, or another computing device, or may be received via a cell phone or email message. Once entered, the first credentials and the second credentials are transmitted to an authentication mechanism to verify the credentials and either permit or restrict the user's access to the application, network, or server.

Security credentials may be a concatenated form of the fixed password and the OTP. In these instances, software applications should only store the first form of identification as retransmitting an expired set of set of credentials would only cause an authentication mechanism to deny access to the user.

Methods are known to analyze input security credentials to determine if they are MFA credentials to ascertain if they should be stored for automatic input or not. One known method evaluates the cadence of key stokes of the security credentials to identify a pause between the input of a fixed password and the input of an OTP. If it was determined that MFA was not being used then the client would store the password and reuse it when the session expired. However, if it was determined that MFA was being used, the client would not store the password, and would re-prompt the user for it each time, to avoid invalidating the user's password.

SUMMARY

According to an aspect of the present invention there is provided a computer-implemented method for security credentials management for client applications, comprising: detecting a user is entering security credentials for authentication of a client application; hashing at least a portion of the entered credentials to obtain current hashed credentials and storing the current hashed credentials; comparing the current hashed credentials to previously stored hashed credentials for the client application; and, if the current hashed credentials and the previously stored hashed credentials match, storing the credentials for automatic completion of the credentials for the client application.

According to another aspect of the present invention there is provided a system for security credentials management for client applications, comprising: a processor and a memory configured to provide computer program instructions to the processor to execute the function of the components: a credentials detecting component for detecting a user is entering security credentials for authentication of a client application; a hashing component for hashing at least a portion of the entered credentials to obtain current hashed credentials and a hash storing component for storing the current hashed credentials; a comparing component for comparing the current hashed credentials to previously stored hashed credentials for the client application; and an automatic credentials component for, if the current hashed credentials and the previously stored hashed credentials match, a credentials storing component for storing the credentials for automatic completion of the credentials for the client application.

According to a further aspect of the present invention there is provided a computer program product for security credentials management for client applications, the computer program product comprising a computer readable storage medium having program instructions embodied therewith, the program instructions executable by a processor to cause the processor to: detect a user is entering security credentials for authentication of a client application; hash at least a portion of the entered credentials to obtain current hashed credentials and storing the current hashed credentials; compare the current hashed credentials to previously stored hashed credentials for the client application; and, if the current hashed credentials and the previously stored hashed credentials match, store the credentials for automatic completion of the credentials for the client application.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Preferred embodiments of the present invention will now be described, by way of example only, with reference to the following drawings in which.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

A method and system are described for security credentials management for client applications. Security credentials management stores credentials for automatic provision when using a client application. However, the management needs to distinguish between security credentials that are fixed and those that vary due to MFA methods. In particular, an MFA method may concatenate an OTP with a fixed password to form credentials.

Embodiments of the present invention recognize that current MFA analysis and methods may result in false positives when identifying MFA credentials. A false positive would result in the user's password not being stored resulting in a poor user experience. A false positive could occur when the user enters a complex password that ends in a date or number combination that they have to remember, and would therefore result in the second half of the password having a slower key stroke input speed.

Embodiments of the present invention provide solutions for comparing currently provided credentials with previously entered credentials for the client application by comparing hashes of either the whole credentials or one or more portions of the credentials.

In one embodiment, the whole credentials are compared and if they match, the credentials are suitable to be stored for automatic completion for the client application. This may be useful as a back-up check when an analysis has been carried out that suggests that the credentials are MFA credentials that should not be stored.

In another embodiment, the credentials may be split into two portions, a first part that is assumed to be a fixed password and a second part that is assumed to be a variable token such as an OTP. At least the second part may be hashed and compared to previous hashed versions of the second part to see if in fact the portion is a variable token. In another variation, both parts are compared as explained further below.

The method detects usage of MFA by a user at a client side using a piece of client software for running simple heuristics for checking whether entered credentials include an MFA token by comparing the password and token every time it is entered.

Figure 1:
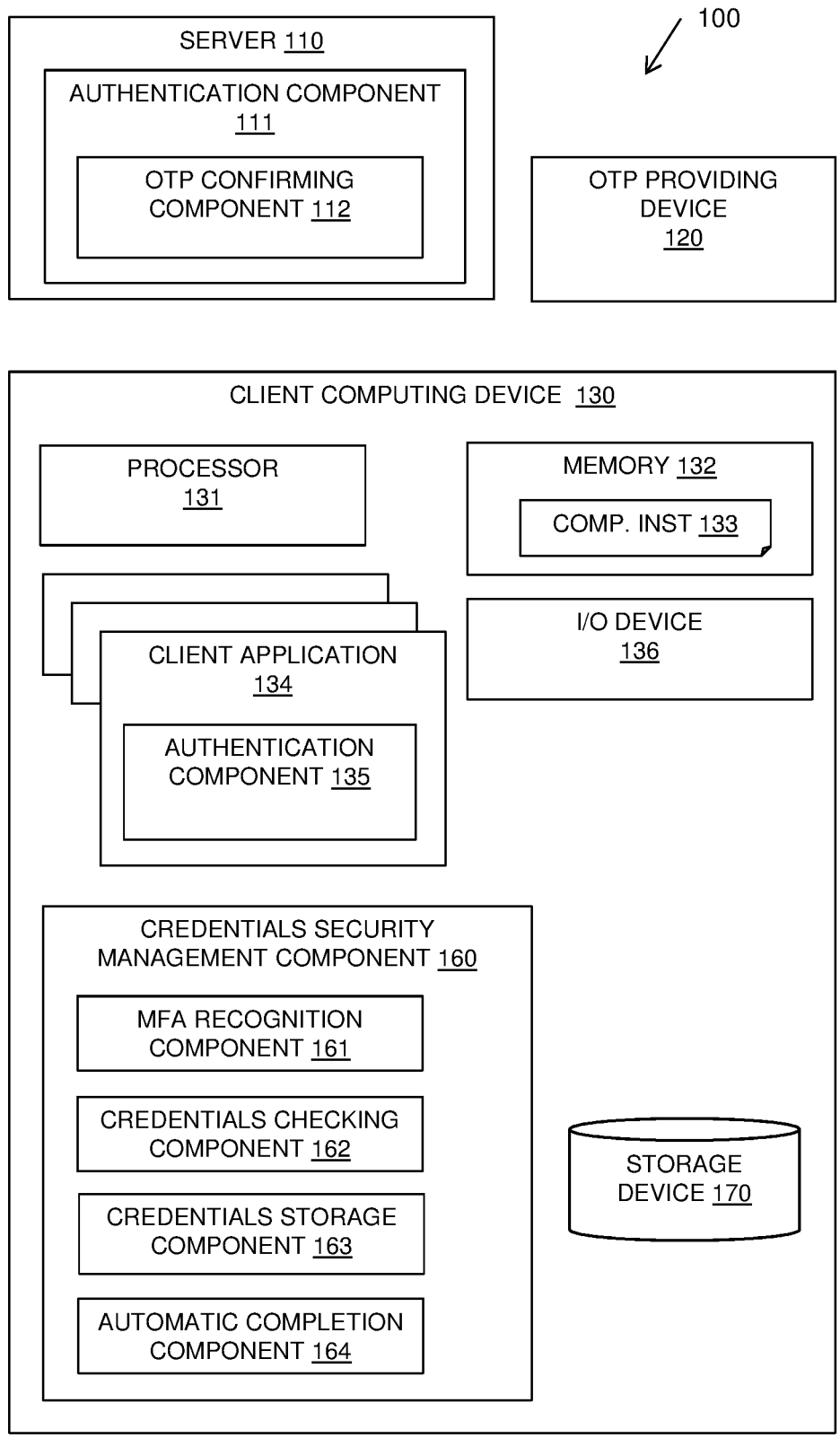
FIG. 1 is a block diagram of an example embodiment of a system in which the present invention may be implemented.

Referring to FIG. 1, an example embodiment of a system 100 is provided in which the present invention may be implemented. The system 100 may include a client computing device 130 with client applications 134 that require authentication when connecting to associated remote servers 110 or networks.

The client computing device 130 may include at least one processor 131, a hardware module, or a circuit for executing the functions of the described components which may be software units executing on the at least one processor. Multiple processors running parallel processing threads may be provided enabling parallel processing of some or all of the functions of the components. Memory 132 may be configured to provide computer instructions 133 to the at least one processor 131.

The computer instructions 133 may include client applications 134 that require authentication, for example, through an authentication component 135 of the application. The client computing device 130 may also include an Input/Output device 136 for inputting credentials, which may be a keyboard, a mouse, a touchscreen display, etc., into the authentication component 135.

The authentication component 135 may use an MFA in which an OTP is provided from another source such as an OTP providing device 120 for input to the client application 134 authentication component 135 by means of the I/O device 136. The OTP may be input concatenated to a fixed password of the user of the client application 134.

The described system provides a credentials security management component 160 for managing credentials input via a client computing device 130. The credentials security management component 160 may be provided locally to the client computing device 130 or may be provided as a secure remote service. The credentials security management component 160 may provide a credentials storage component 163 for storage of credentials at a storage device 170, either at the client computing device 130 or remotely via secure communication channels, and an automatic completion component 164 for automatic completion of the credentials in the authentication component 135.

The credentials security management component 160 may include an MFA recognition component 161 for identifying when the authentication component 135 is using MFA in order to evaluate which credentials may be stored for automatic completion. The described system provides a credentials checking component 162 for verifying whether credentials are variable MFA credentials that should not be stored or are fixed credentials that may be stored.

Figure 2:
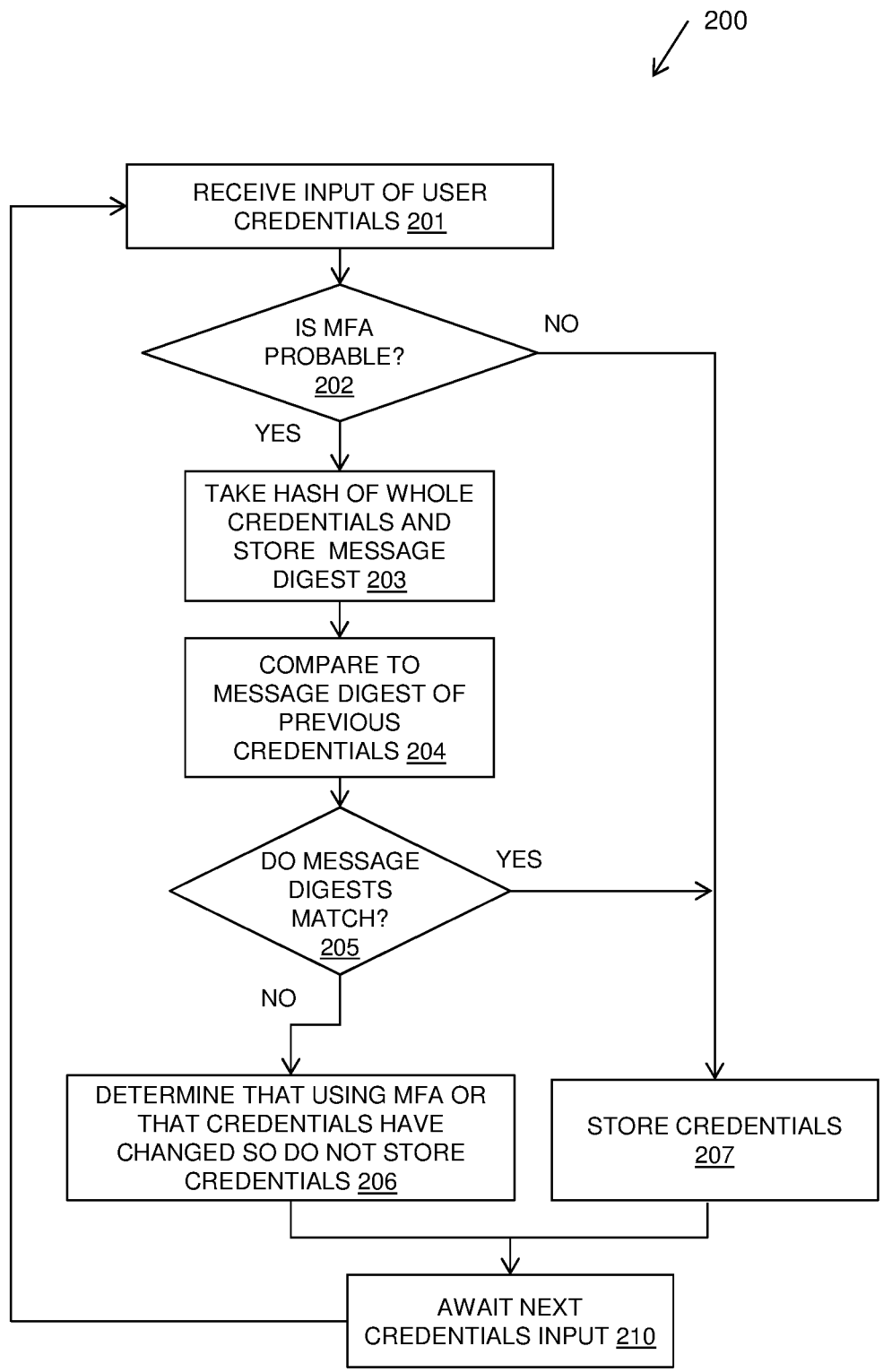
FIG. 2 is a flow diagram of a first example embodiment of a method in accordance with the present invention.

Referring to FIG. 2, a flow diagram 200 shows a first example embodiment of the described method as carried out by a credentials security management component 160.

The method may receive 201 input of user credentials for a client application. It may be determined 202 if the credentials include the probable use of MFA. This may be determined by various methods, including analysis of the cadence of input key strokes of the credentials to determine if there is a delay or slower input of a portion of the credentials indicating a use of a variable token such as an OTP. In one embodiment, the probable use of MFA is measured by a threshold probability.

If it is determined to be not probable that the credentials use MFA, the credentials may be stored 207 for future automatic completion.

However, if it is determined to be probable that the credentials use MFA, this may be checked by taking 203 a secure hash of the whole string of the input credentials and storing the result. A secure hash may apply a one-way cryptographic hash function to produce a message digest of the credentials. The message digest can be stored securely and can be used to verify that another message digest has been generated from the same input credentials. The verification is carried out by comparing 204 the currently generated message digest with a stored previously generated message digest of previously entered credentials.

It may be determined 205 if the message digests match. If so, this indicates that the credentials do not include a variable token and can be stored 207 for automatic completion of authentication.

If it is determined 205 that the message digests do not match, this indicates that the credentials either include a variable token as used in MFA or that the credentials have changed, so the credentials are not stored 206. If the credentials have changed due to a password update and do not contain a variable token, the message digest generated the next time the credentials are entered will match this generated message digest and the credentials will be stored.

The message may then await the input 210 of the next credentials and the method may repeat.

Figure 3:
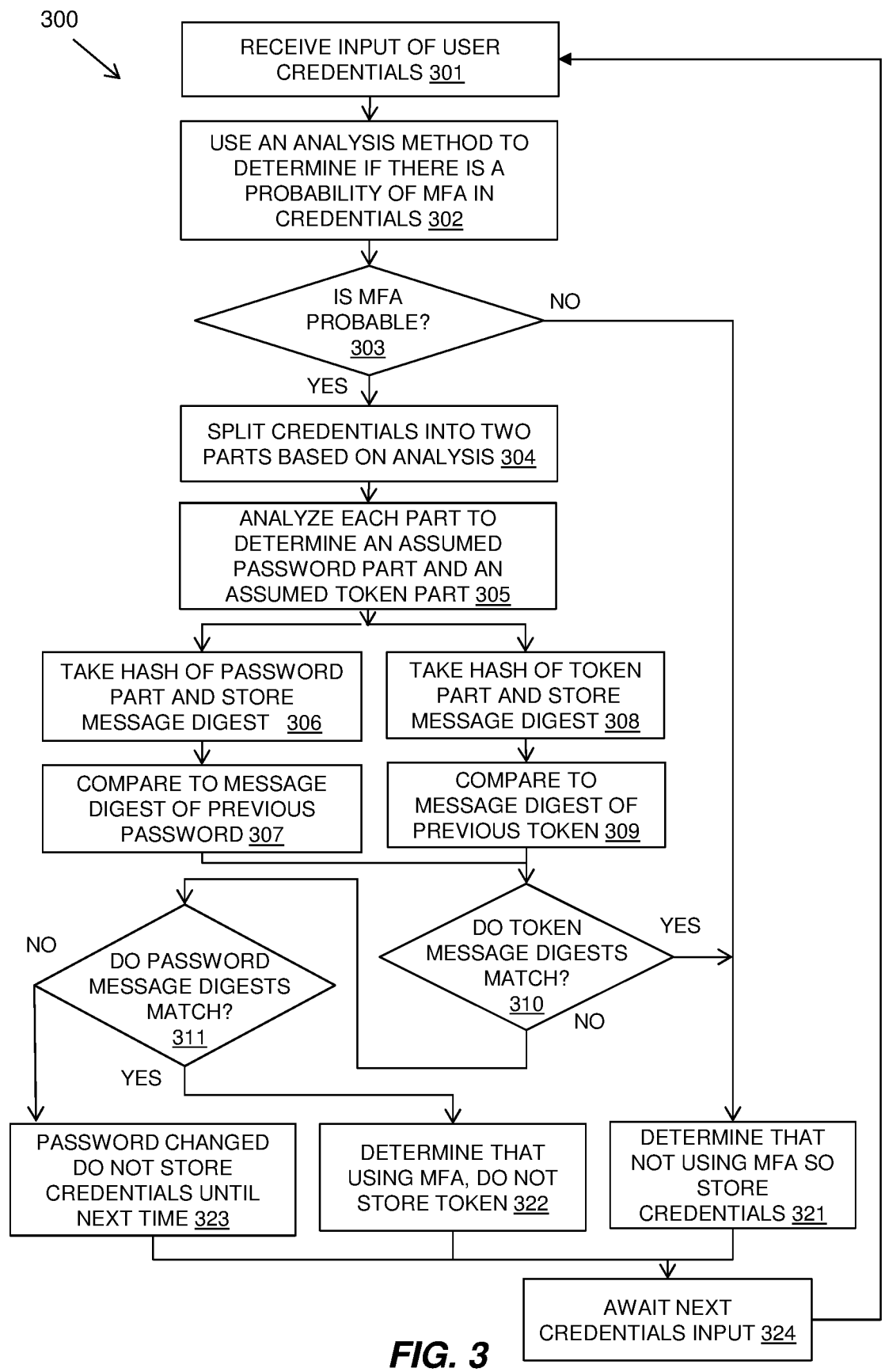
FIG. 3 is a flow diagram of a second example embodiment of a method in accordance with the present invention.

Referring to FIG. 3, a flow diagram 300 shows a second example embodiment of the described method as carried out by a credentials security management component 160.

In a manner similar to the first embodiment, the method may receive 301 input of user credentials for a client application. It may be determined 302 if the credentials include the probable use of MFA. This may be determined by various methods, including analysis of the cadence of input key strokes of the credentials to determine if there is a delay or slower input of a portion of the credentials indicating a use of a variable token such as an OTP. In one embodiment, the probable use of MFA is measured by a threshold probability.

If it is determined 303 to be not probable that the credentials use MFA, the credentials may be stored 321 for future automatic completion.

However, if it is determined 303 to be probable that the credentials use MFA, the method may split 304 the credentials based on the analysis of whether MFA is being used and may analyze 305 the split portions to determine an assumed fixed password part and an assumed variable token part. For example, the method using the cadence of input key strokes may indicate a clear distinction between two parts of the credentials one of which may be assumed to be a fixed password and one of which may be assumed to be a variable token such as an OTP.

For example, if the cadence of the key strokes indicates a pause during input, the pause may show the division between the two parts and the comparative speed of input of the key strokes in each part may indicate a known fixed password by faster input than a newly received variable token. Another method of determining if a portion is a variable token is analyzing the characters and a mostly numeric portion may indicate a variable token.

The method may take 306 a secure hash of the assumed fixed password part and may store the resultant message digest. The currently generated message digest may be compared 307 to a previously stored message digest.

The method may also take 308 a secure hash of the assumed variable token part and may store the resultant message digest. The currently generated message digest may be compared 309 to a previously stored message digest.

The hashed comparison may use a non-salted hashing algorithm such as MD5, SHA or SHA256. This means that the hash for a specific string will always be the same so can be compared directly. These non-salted hashing algorithms are not likely to be used when sending the password across the wire, as they are not as secure as newer salted algorithms; however, they are secure enough to be stored locally by the client for this purpose of determining if MFA is being used.

It may be determined 310 if the message digests of the assumed variable token parts match. If so, this indicates that the assumed variable token parts are in fact fixed and MFA is not being used and so the credentials may be stored 321 for automatic completion in the future. For example, this may occur when an assumed variable token is actually a date at the end of the password or other password portion that may have had a slower input cadence.

If it is determined 310 that the message digests of the assumed variable token parts do not match, they are in fact variable indicating that MFA is being used in the credentials. The method may then determine 311 if the message digests of the assumed fixed password parts match. If so, it may be assumed that the credentials are using 322 MFA and at least the token part should not be stored. It may be possible to store the fixed password part for future automatic completion.

If it is determined 311 if the message digests of the assumed fixed password parts do not match, this may indicate that the password has been reset 323 and the credentials should not be stored until a next iteration in which the new password is confirmed.

In all cases, the method may then await 324 the next input of the credentials for verification. The correctness of an assumption that MFA is being used may be verified over several authentication attempts or at each authentication.

The method uses software on a client side for detecting a split between a fixed password and a variable token and hashing both sides, storing them, and comparing the two sides each time credentials are required by checking that the password part remains the same and that the token part changes each time.

Known method may be used to detect if it is likely that the credentials are using MFA. If it is likely that MFA is being used, rather than not storing the password at this point, the additional steps are carried out to verify if the credentials include a variable portion. It is possible that the user's password may end in a date that may be interpreted as a token by an MFA analysis system and a false positive of MFA may be assumed, when in fact the credentials are fixed and may be stored.

The method may be used to provide a deeper analysis of differences between two entered credentials to determine whether an MFA token is being used, in the case where the server does not already know whether MFA is being used or not.

Figure 4:
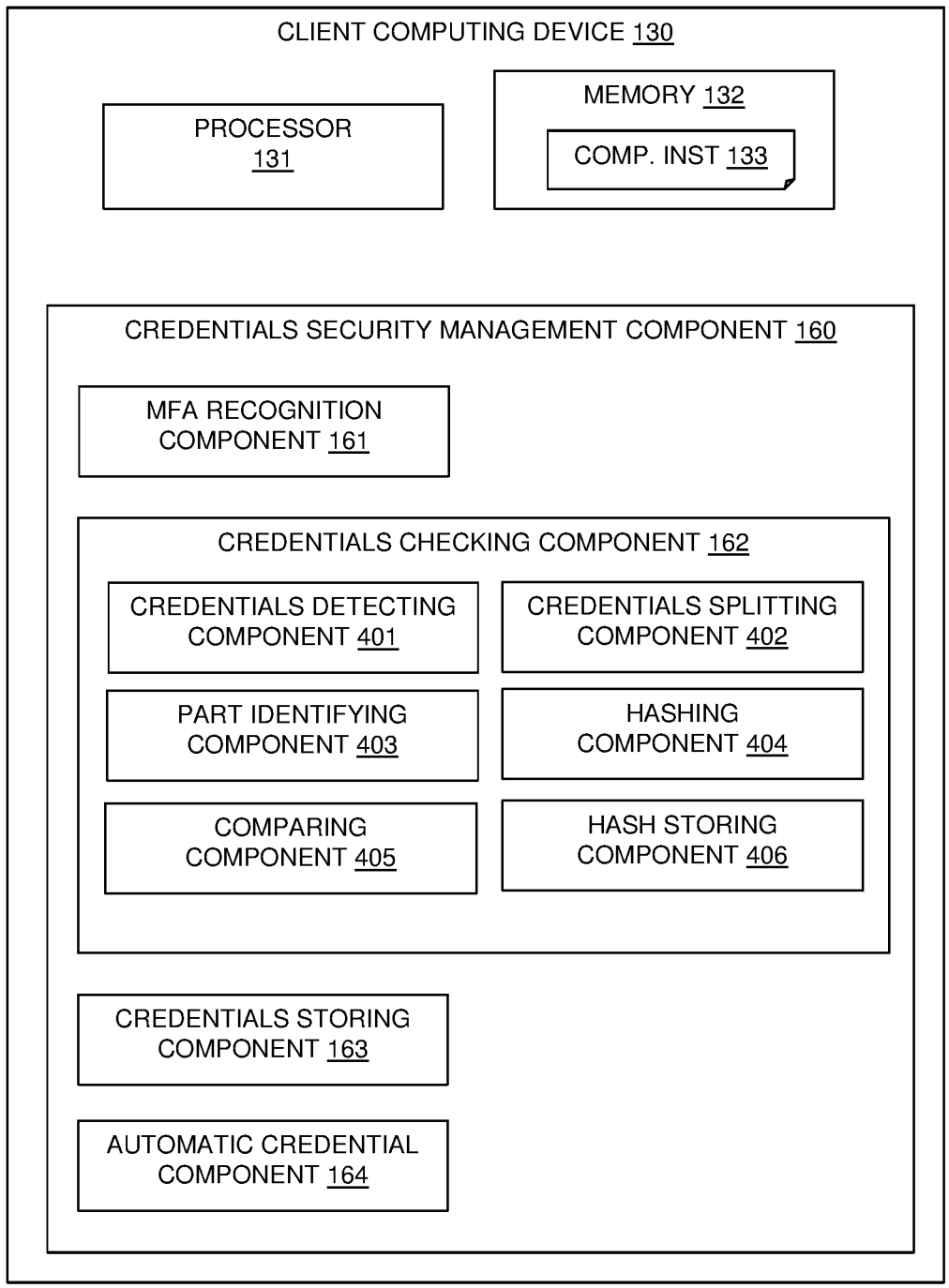
FIG. 4 is block diagram of an example embodiment of a system in accordance with the present invention.

Referring to FIG. 4, a block diagram shows further details of the credentials checking component 162 of the credentials security management component 160 of FIG. 1.

The credentials checking component 162 may include a credentials detecting component 401 for detecting that a user is entering security credentials for authentication of a client application. The credentials detecting component 401 may be limited to credentials that are determined by an MFA recognition component 161 as having a threshold probability of using an MFA method.

The credentials checking component 162 may include a credentials splitting component 402 for splitting the entered security credentials into a first part and a second part based on analysis of the entered security credentials to identify a pause or change in cadence of the input between the first part and the second part. The credentials checking component 162 may include a part identifying component 403 for determining that the first part or the second part is an assumed variable token portion by analyzing the input of the credentials and the other of the first part or the second part is an assumed fixed password portion.

The credentials checking component 162 may include a hashing component 404 for hashing at least a portion of the entered credentials to obtain current hashed credentials, a hash storing component 406 for storing the current hashed credentials, and a comparing component 405 for comparing the current hashed credentials to previously stored hashed credentials for the client application.

The hashing component 404 and the comparing component 405 may operate on the entire credentials string or one or both of the first and second parts separately.

The credentials security management component 160 may include an automatic credentials component 164 and a credentials storing component 163 for storing the credentials for automatic completion of the credentials for the client application if MFA is not used in the authentication credentials.

In embodiments in which the credentials are split into an assumed fixed password portion and an assumed variable token portion, the following may occur.

If the comparing component 405 determines that the current hashed credentials and the previously stored hashed credentials of the assumed variable token portion match, the credentials storing component 163 may store the credentials for automatic completion of the credentials of the client application.

If the comparing component 405 determines that the current hashed credentials and the previously stored hashed credentials of the assumed variable token portion do not match and the current hashed credentials and the previously stored hashed credentials of the assumed fixed password portion match, the credentials storing component 163 may store the assumed fixed password portion for automatic completion of partial credentials of the client application.

If the comparing component 405 determines that the current hashed credentials and the previously stored hashed credentials of the assumed fixed password portion do not match, the credentials storing component 164 may wait for the next input credentials before storing credentials for automatic completion of the credentials of the client application.

Figure 5:
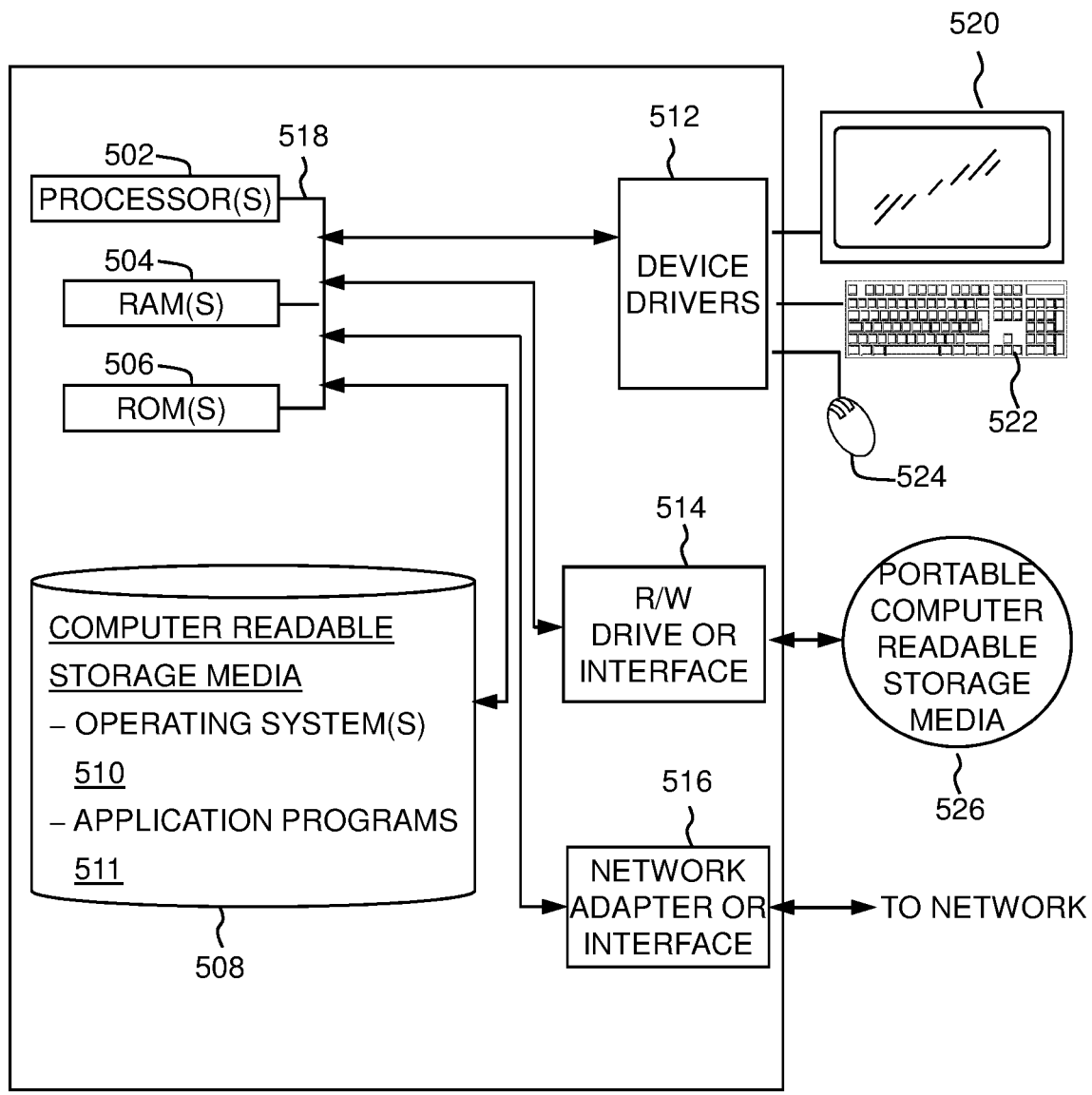
FIG. 5 is a block diagram of an embodiment of a computer system or cloud server in which the present invention may be implemented.

FIG. 5 depicts a block diagram of components of the client computing device 130 of the system 100 of FIG. 1, in accordance with an embodiment of the present invention. It should be appreciated that FIG. 5 provides only an illustration of one implementation and does not imply any limitations with regard to the environments in which different embodiments may be implemented. Many modifications to the depicted environment may be made.

Client computing device 130 can include one or more processors 502, one or more computer-readable RAMs 504, one or more computer-readable ROMs 506, one or more computer readable storage media 508, device drivers 512, read/write drive or interface 514, and network adapter or interface 516, all interconnected over a communications fabric 518. Communications fabric 518 can be implemented with any architecture designed for passing data and/or control information between processors (such as microprocessors, communications and network processors, etc.), system memory, peripheral devices, and any other hardware components within the system.

One or more operating systems 510, and application programs 511, such as the client applications 131 and credentials security management component are stored on one or more of the computer readable storage media 508 for execution by one or more of the processors 502 via one or more of the respective RAMs 504 (which typically include cache memory). In the illustrated embodiment, each of the computer readable storage media 508 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the invention.

Client computing device 130 can also include a R/W drive or interface 514 to read from and write to one or more portable computer readable storage media 526. Application programs 511 on client computing device 130 can be stored on one or more of the portable computer readable storage media 526, read via the respective R/W drive or interface 514 and loaded into the respective computer readable storage media 508.

Client computing device 130 can also include a network adapter or interface 516, such as a TCP/IP adapter card or wireless communication adapter. Application programs 511 on client computing device 130 can be downloaded to the computing device from an external computer or external storage device via a network (for example, the Internet, a local area network or other wide area networks or wireless networks) and network adapter or interface 516. From the network adapter or interface 516, the programs may be loaded into the computer readable storage media 508. The network may comprise copper wires, optical fibers, wireless transmission, routers, firewalls, switches, gateway computers and edge servers.

Client computing device 130 can also include a display screen 520, a keyboard or keypad 522, and a computer mouse or touchpad 524. Device drivers 512 interface to display screen 520 for imaging, to keyboard or keypad 522, to computer mouse or touchpad 524, and/or to display screen 520 for pressure sensing of alphanumeric character entry and user selections. The device drivers 512, R/W drive or interface 514, and network adapter or interface 516 can comprise hardware and software stored in computer readable storage media 508 and/or ROM 506.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud Computing

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
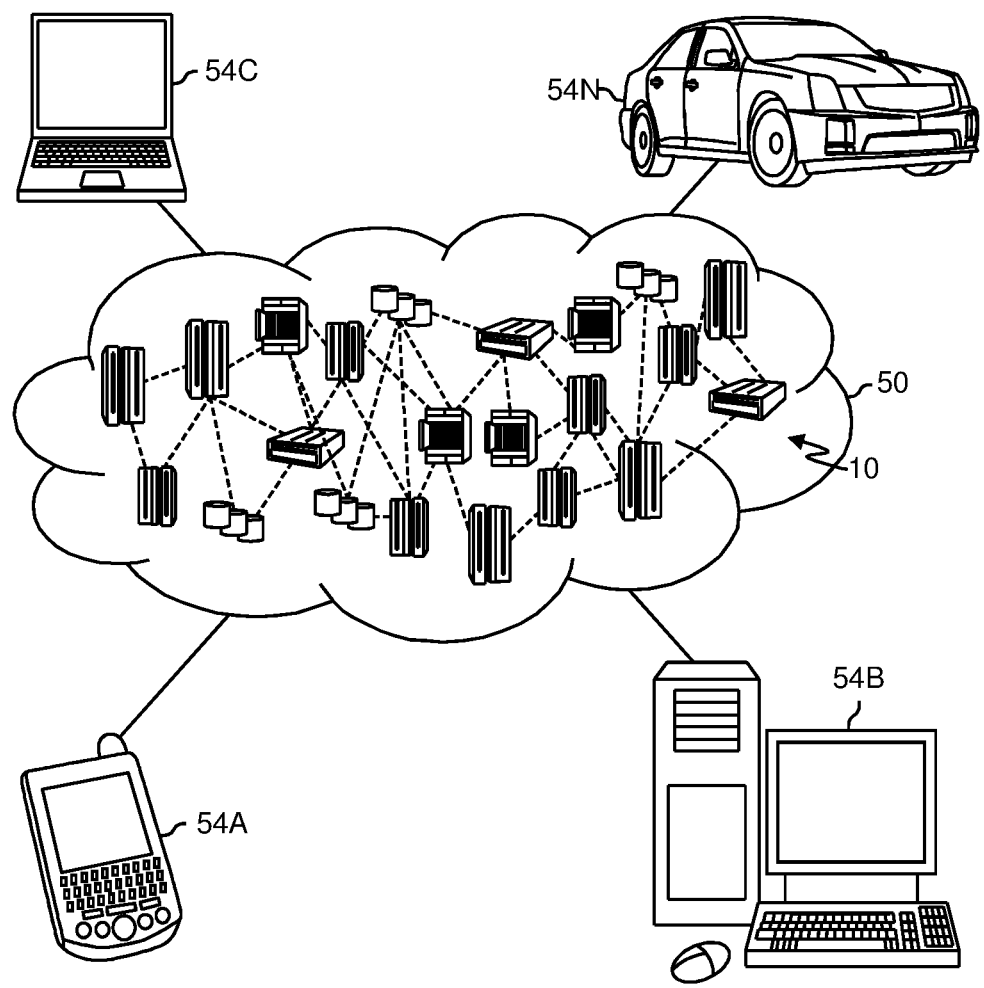
FIG. 6 is a schematic diagram of a cloud computing environment in which the present invention may be implemented.

Referring now to FIG. 67, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
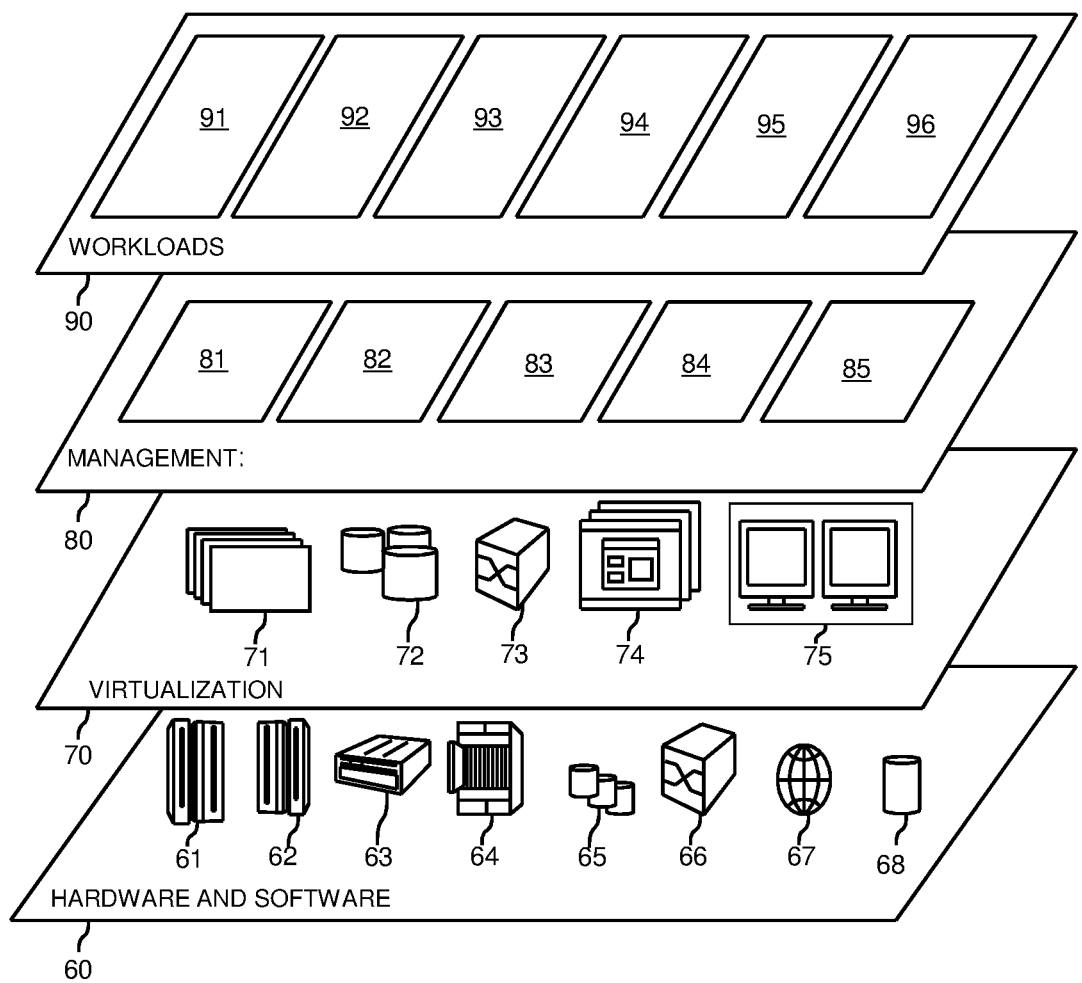
FIG. 7 is a diagram of abstraction model layers of a cloud computing environment in which the present invention may be implemented.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and security credentials management processing 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A computer-implemented method for security credentials management for client applications, comprising:
    detecting a user is entering security credentials for authentication of a client application;
    hashing at least a portion of the entered credentials to obtain current hashed credentials and storing the current hashed credentials;
    comparing the current hashed credentials to previously stored hashed credentials for the client application;
    if the current hashed credentials and the previously stored hashed credentials match, storing the detected security credentials for automatic completion of the security credentials required for the client application; and
    determining that there is a threshold probability that the user is using a multi-factor authentication method based on a cadence of entering a security credentials.

2. The computer-implemented method of claim 1, further comprising:
    splitting the entered security credentials into a first part and a second part based on analysis of the entered security credentials to identify a pause or change in cadence of input between the first part and the second part,
    wherein hashing and comparing the entered credentials is carried out for one or both of the first and second parts separately.

3. The computer-implemented method of claim 2, further comprising:
    determining that the first part or the second part is an assumed variable token portion by analyzing the input of the credentials and the other of the first part or the second part is an assumed fixed password portion.

4. The computer-implemented method of claim 3, wherein, if the current hashed credentials and the previously stored hashed credentials of the assumed variable token portion match, storing the security credentials for automatic completion of the security credentials of the client application.

5. The computer-implemented method of claim 3, wherein, if the current hashed credentials and the previously stored hashed credentials of the assumed variable token portion do not match and the current hashed credentials and the previously stored hashed credentials of the assumed fixed password portion match, storing the assumed fixed password portion for automatic completion of partial credentials of the client application.

6. The computer-implemented method of claim 3, wherein, if the current hashed credentials and the previously stored hashed credentials of the assumed fixed password portion do not match, repeating the method for subsequent input credentials before storing credentials for automatic completion of the credentials of the client application.

7. The computer-implemented method of claim 1, wherein the method is carried out at a client computing device for storing credentials at the client computing device for automatic completion of the credentials for client applications.

8. The computer-implemented method of claim 1, wherein the method is carried out for a client computing device at a remote service for storing credentials at the client computing device for automatic completion of the credentials for client applications.

9. A computer system for security credentials management for client applications, comprising:
    a processor and a memory configured to provide computer program instructions to the processor to execute the function of the components:
    a credentials detecting component for detecting a user is entering security credentials for authentication of a client application;
    a hashing component for hashing at least a portion of the entered credentials to obtain current hashed credentials and a hash storing component for storing the current hashed credentials;
    a comparing component for comparing the current hashed credentials to previously stored hashed credentials for the client application;
    an automatic credentials component for, if the current hashed credentials and the previously stored hashed credentials match, a credentials storing component for storing the detected security credentials for automatic completion of the security credentials for the client application; and
    a multi-factor authentication recognition component for determining that there is a threshold probability that the user is using a multi-factor authentication method based on a cadence of entering a security credential.

10. The computer system of claim 9, further comprising:
    a credentials splitting component for splitting the entered security credentials into a first part and a second part based on analysis of the entered security credentials to identify a pause or change in cadence of input between the first part and the second part;
    wherein the hashing component and the comparing component operate on one or both of the first and second parts separately.

11. The computer system of claim 10, further comprising:
    a part identifying component for determining that the first part or the second part is an assumed variable token portion by analyzing the input of the credentials and the other of the first part or the second part is an assumed fixed password portion.

12. The computer system of claim 10, wherein, if the comparing component determines that the current hashed credentials and the previously stored hashed credentials of the assumed variable token portion match, the credentials storing component stores the credentials for automatic completion of the credentials of the client application.

13. The computer system of claim 10, wherein, if the comparing component determines that the current hashed credentials and the previously stored hashed credentials of the assumed variable token portion do not match and the current hashed credentials and the previously stored hashed credentials of the assumed fixed password portion match, the credentials storing component stores the assumed fixed password portion for automatic completion of partial credentials of the client application.

14. The computer system of claim 10, wherein, if the comparing component determines that the current hashed credentials and the previously stored hashed credentials of the assumed fixed password portion do not match, the credentials storing component waits for subsequent input credentials before storing credentials for automatic completion of the credentials of the client application.

15. The computer system of claim 9, wherein the system is carried out at a client computing device for storing credentials at the client computing device for automatic completion of the credentials for client applications.

16. The computer system of claim 9, wherein the system is carried out for a client computing device at a remote service for storing credentials at the client computing device for automatic completion of the credentials for client applications.

17. A computer program product for security credentials management for client applications, the computer program product comprising a computer readable storage medium having program instructions embodied therewith, the program instructions executable by a processor to cause the processor to:
- detect a user is entering security credentials for authentication of a client application;
- hash at least a portion of the entered credentials to obtain current hashed credentials and storing the current hashed credentials;
- compare the current hashed credentials to previously stored hashed credentials for the client application;
- if the current hashed credentials and the previously stored hashed credentials match, store the detected security credentials for automatic completion of the security credentials for the client application; and
- determine that there is a threshold probability that the user is using a multi-factor authentication method based on a cadence of entering a security credentials.

\* \* \* \* \*